United States Patent
Liu et al.

(10) Patent No.: US 11,101,501 B2
(45) Date of Patent: Aug. 24, 2021

(54) ELECTROLYTE AND NEGATIVE ELECTRODE STRUCTURE

(71) Applicants: GM GLOBAL TECHNOLOGY OPERATIONS LLC, Detroit, MI (US); THE REGENTS OF THE UNIVERSITY OF CALIFORNIA, Oakland, CA (US)

(72) Inventors: Fang Liu, Los Angeles, CA (US); Qiangfeng Xiao, Troy, MI (US); Yunfeng Lu, Los Angeles, CA (US); Mei Cai, Bloomfield Hills, MI (US); Fang Dai, Troy, MI (US); Li Yang, Troy, MI (US)

(73) Assignees: GM GLOBAL TECHNOLOGY OPERATIONS LLC, Detroit, MI (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/659,005

(22) Filed: Oct. 21, 2019

(65) Prior Publication Data

US 2020/0052338 A1 Feb. 13, 2020

Related U.S. Application Data

(62) Division of application No. 14/958,842, filed on Dec. 3, 2015, now abandoned.

(Continued)

(51) Int. Cl.
*H01M 10/0567* (2010.01)
*H01M 10/0569* (2010.01)
(Continued)

(52) U.S. Cl.
CPC ... *H01M 10/0567* (2013.01); *H01M 10/0568* (2013.01); *H01M 10/0569* (2013.01);
(Continued)

(58) Field of Classification Search
CPC ......... H01M 10/0567; H01M 10/0568; H01M 10/0569; H01M 10/4235; H01M 2220/20;
(Continued)

(56) References Cited

U.S. PATENT DOCUMENTS

| | | | | |
|---|---|---|---|---|
| 5,593,795 A | * | 1/1997 | Chen | C08G 65/329 429/313 |
| 7,018,607 B2 | | 3/2006 | Nazri et al. | |

(Continued)

FOREIGN PATENT DOCUMENTS

| | | |
|---|---|---|
| CA | 2922959 A1 | 6/2016 |
| CN | 1328355 A | 12/2001 |

(Continued)

OTHER PUBLICATIONS

First Office Action for Chinese Patent Application No. 201810865440.1 dated Jan. 6, 2021 with English language machine translation, 19 pages.

(Continued)

*Primary Examiner* — Christopher P Domone
*Assistant Examiner* — Kimberly Wyluda
(74) *Attorney, Agent, or Firm* — Harness, Dickey & Pierce, P.L.C.

(57) ABSTRACT

An example electrolyte includes a solvent, a lithium salt, and an additive selected from the group consisting of a mercaptosilane, a mercaptosiloxane, and combinations thereof. The electrolyte may be used in a method for making a solid electrolyte interface (SEI) layer on a surface of an electrode. A negative electrode structure may be formed from the method.

12 Claims, 3 Drawing Sheets

Related U.S. Application Data

(60) Provisional application No. 62/090,181, filed on Dec. 10, 2014.

(51) Int. Cl.
*H01M 10/0568* (2010.01)
*H01M 10/42* (2006.01)

(52) U.S. Cl.
CPC .... *H01M 10/4235* (2013.01); *H01M 2220/20* (2013.01); *H01M 2220/30* (2013.01); *H01M 2300/0025* (2013.01); *H01M 2300/0028* (2013.01); *H01M 2300/0037* (2013.01)

(58) Field of Classification Search
CPC ..... H01M 2220/30; H01M 2300/0025; H01M 2300/0028; H01M 2300/0037
See application file for complete search history.

(56) References Cited

U.S. PATENT DOCUMENTS

| | | |
|---|---|---|
| 7,208,248 B2 | 4/2007 | Hayashi et al. |
| 7,736,805 B2 | 6/2010 | Nazri et al. |
| 8,101,152 B1 | 1/2012 | Halalay et al. |
| 8,148,455 B2 | 4/2012 | Posudievsky et al. |
| 8,383,273 B2 | 2/2013 | Machida et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,568,930 B2 | 10/2013 | Halalay et al. |
| 8,642,201 B2 | 2/2014 | Cheng et al. |
| 8,647,779 B2 | 2/2014 | Machida et al. |
| 8,658,295 B2 | 2/2014 | Cheng et al. |
| 8,663,840 B2 | 3/2014 | Nazri et al. |
| 8,679,680 B2 | 3/2014 | Vanimisetti et al. |
| 8,785,054 B2 | 7/2014 | Halalay et al. |
| 8,828,481 B2 | 9/2014 | Burton et al. |
| 8,835,056 B2 | 9/2014 | Xiao et al. |
| 8,974,946 B2 | 3/2015 | Cai et al. |
| 8,999,584 B2 | 4/2015 | Jiang et al. |
| 9,012,075 B2 | 4/2015 | Verbrugge et al. |
| 9,023,520 B2 | 5/2015 | Halalay et al. |
| 9,028,565 B2 | 5/2015 | Huang |
| 9,077,038 B2 | 7/2015 | Halalay et al. |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,252,411 B2 | 2/2016 | Abd Elhamid et al. |
| 9,281,515 B2 | 3/2016 | Nazri |
| 9,302,914 B2 | 4/2016 | Liu et al. |
| 9,337,512 B2 | 5/2016 | An et al. |
| 9,350,046 B2 | 5/2016 | Huang |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,362,560 B2 | 6/2016 | Nazri |
| 9,373,829 B2 | 6/2016 | Xiao et al. |
| 9,412,986 B2 | 8/2016 | Huang |
| 9,437,871 B2 | 9/2016 | Zhou et al. |
| 9,520,594 B2 | 12/2016 | Neumann et al. |
| 9,537,144 B2 | 1/2017 | Huang et al. |
| 9,583,767 B2 | 2/2017 | Verbrugge et al. |
| 9,647,254 B2 | 5/2017 | Dadheech et al. |
| 9,742,028 B2 | 8/2017 | Zhou et al. |
| 9,786,906 B2 | 10/2017 | Yang et al. |
| 9,896,763 B2 | 2/2018 | Dadheech et al. |
| 10,354,810 B2 | 7/2019 | Ikenuma et al. |
| 10,608,249 B2 | 3/2020 | Liu et al. |
| 2002/0012850 A1 | 1/2002 | Schmidt et al. |
| 2003/0003361 A1 | 1/2003 | Sunagawa et al. |
| 2005/0106470 A1* | 5/2005 | Yoon ............. H01M 10/0569 429/324 |
| 2005/0276910 A1 | 12/2005 | Gupta |
| 2006/0147799 A1 | 7/2006 | Hayashi et al. |
| 2007/0195448 A1 | 8/2007 | Xie et al. |
| 2007/0287070 A1 | 12/2007 | Okumura et al. |
| 2008/0186030 A1 | 8/2008 | Kasamatsu et al. |
| 2008/0245553 A1 | 10/2008 | Sakai et al. |
| 2009/0155598 A1 | 6/2009 | Bierwagen et al. |
| 2009/0325071 A1 | 12/2009 | Verbrugge et al. |
| 2010/0273048 A1 | 10/2010 | Machida et al. |
| 2011/0027650 A1 | 2/2011 | Yamamoto et al. |
| 2011/0086249 A1 | 4/2011 | Timmons |
| 2011/0086294 A1 | 4/2011 | Xiao et al. |
| 2011/0121225 A1 | 5/2011 | Posudievsky et al. |
| 2011/0151333 A1 | 6/2011 | Halalay et al. |
| 2011/0165459 A1 | 7/2011 | Halalay et al. |
| 2012/0100403 A1 | 4/2012 | Wang et al. |
| 2012/0175551 A1 | 7/2012 | Watanabe et al. |
| 2012/0229096 A1 | 9/2012 | Nazri |
| 2012/0231321 A1 | 9/2012 | Huang et al. |
| 2012/0328927 A1 | 12/2012 | Timmons et al. |
| 2013/0078517 A1 | 3/2013 | Shon et al. |
| 2013/0099159 A1 | 4/2013 | Halalay et al. |
| 2013/0136997 A1 | 5/2013 | An et al. |
| 2013/0244080 A1 | 9/2013 | Song et al. |
| 2013/0284338 A1 | 10/2013 | Xiao et al. |
| 2013/0327648 A1* | 12/2013 | Grant ................ C25D 11/00 205/59 |
| 2014/0154533 A1* | 6/2014 | Schaefer ............. H01M 4/628 429/50 |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0342244 A1 | 11/2014 | West et al. |
| 2015/0014890 A1 | 1/2015 | Xiao |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0056517 A1 | 2/2015 | Zhou et al. |
| 2015/0104690 A1 | 4/2015 | Xiao et al. |
| 2015/0147662 A1 | 5/2015 | Park et al. |
| 2015/0162583 A1 | 6/2015 | Dadheech et al. |
| 2015/0162602 A1 | 6/2015 | Dadheech et al. |
| 2015/0203516 A1 | 7/2015 | Zhang et al. |
| 2015/0236324 A1 | 8/2015 | Xiao et al. |
| 2015/0303453 A1 | 10/2015 | Yang et al. |
| 2015/0349307 A1 | 12/2015 | Dadheech et al. |
| 2016/0020491 A1 | 1/2016 | Dai et al. |
| 2016/0111721 A1 | 4/2016 | Xiao et al. |
| 2016/0141598 A1 | 5/2016 | Dai et al. |
| 2016/0172665 A1 | 6/2016 | Zhou et al. |
| 2016/0172681 A1 | 6/2016 | Yang et al. |
| 2016/0172706 A1 | 6/2016 | Xiao et al. |
| 2016/0218342 A1 | 7/2016 | Xiao et al. |
| 2016/0254567 A1 | 9/2016 | Cai et al. |
| 2016/0351973 A1 | 12/2016 | Albano et al. |
| 2017/0141382 A1 | 5/2017 | Dadheech et al. |
| 2017/0141383 A1 | 5/2017 | Dadheech et al. |
| 2017/0162859 A1 | 6/2017 | Yang et al. |
| 2017/0214079 A1 | 7/2017 | Dai et al. |
| 2017/0222210 A1 | 8/2017 | Xiao |
| 2017/0271678 A1 | 9/2017 | Yang et al. |
| 2017/0288230 A1 | 10/2017 | Yang et al. |
| 2017/0327948 A1 | 11/2017 | Dadheech et al. |
| 2017/0338490 A1 | 11/2017 | Xiao et al. |
| 2018/0048022 A1 | 2/2018 | Yang et al. |
| 2018/0287207 A1 | 10/2018 | Dai et al. |
| 2018/0309165 A1 | 10/2018 | Yersak et al. |
| 2018/0309166 A1 | 10/2018 | Yersak et al. |
| 2018/0375148 A1 | 12/2018 | Yersak et al. |
| 2019/0044134 A1 | 2/2019 | Liu et al. |

FOREIGN PATENT DOCUMENTS

| | | |
|---|---|---|
| CN | 1774826 A | 5/2006 |
| CN | 101471455 A | 7/2009 |
| CN | 101872872 A | 10/2010 |
| CN | 103038930 A | 4/2013 |
| CN | 103050667 A | 4/2013 |
| CN | 104282885 A | 1/2015 |
| CN | 104617259 A | 5/2015 |

(56) References Cited

FOREIGN PATENT DOCUMENTS

| | | |
|---|---|---|
| CN | 105098163 A | 11/2015 |
| CN | 105703005 A | 6/2016 |
| CN | 105703006 A | 6/2016 |
| CN | 106104862 A | 11/2016 |
| CN | 109326770 A | 2/2019 |
| DE | 102014109441 A1 | 1/2015 |
| DE | 102015121310 A1 | 6/2016 |
| DE | 102015121342 A1 | 6/2016 |
| DE | 102018118730 A1 | 2/2019 |
| EP | 2573841 A1 | 3/2013 |
| JP | H0982313 A | 3/1997 |
| KR | 1020120079395 A | 7/2012 |
| KR | 1020120080831 A | 7/2012 |
| TW | 201305085 A | 2/2013 |
| WO | WO-2008128726 A1 | 10/2008 |
| WO | WO-2014059709 A1 | 4/2014 |
| WO | WO-2014182281 A1 | 11/2014 |
| WO | WO-2015126649 A1 | 8/2015 |

OTHER PUBLICATIONS

J. G. Zhang et al., "Lithium Metal Anodes and Rechargeable Lithium Metal Batteries," Chapter 2: Characterization and Modeling of Lithium Dendrite Growth; Springer Series in Materials Science 249, Springer International Publishing Switzerland 2017; DOI 10.1007/978-3-319-44054-5_2, 40 pages.

Kwang-il Chung et al.; "Lithium Phosphorous Oxynitride as a Passive Layer for Anodes in Lithium Secondary Batteries," Journal of Electroanalytical Chemistry 566 (2004); pp. 263-267.

Alexander C. Kozen et al.; "Next-Generation Lithium Metal Anode Engineering Via Atomic Layer Deposition," ACS Nano, vol. 9; No. 6 (Published May 15, 2013) pp. 5884-5892.

First Office Action for Chinese Patent Application No. 201510910062.0 dated Sep. 29, 2017 with English language machine translation; 16 pages.

First Office Action for Chinese Patent Application No. 201510910065.4 dated Oct. 26, 2017 with English language machine translation, 19 pages.

First Office Action for Chinese Patent Application No. 201410381733.4 dated Mar. 3, 2016 with English translation; 16 pages.

Second Office Action for Chinese Patent Application No. 201410381733.4 dated Nov. 14, 2016 with English language machine translation; 26 pages.

Third Office Action for Chinese Patent Application No. 201410381733.4 dated Jul. 4, 2017; 13 pages.

\* cited by examiner

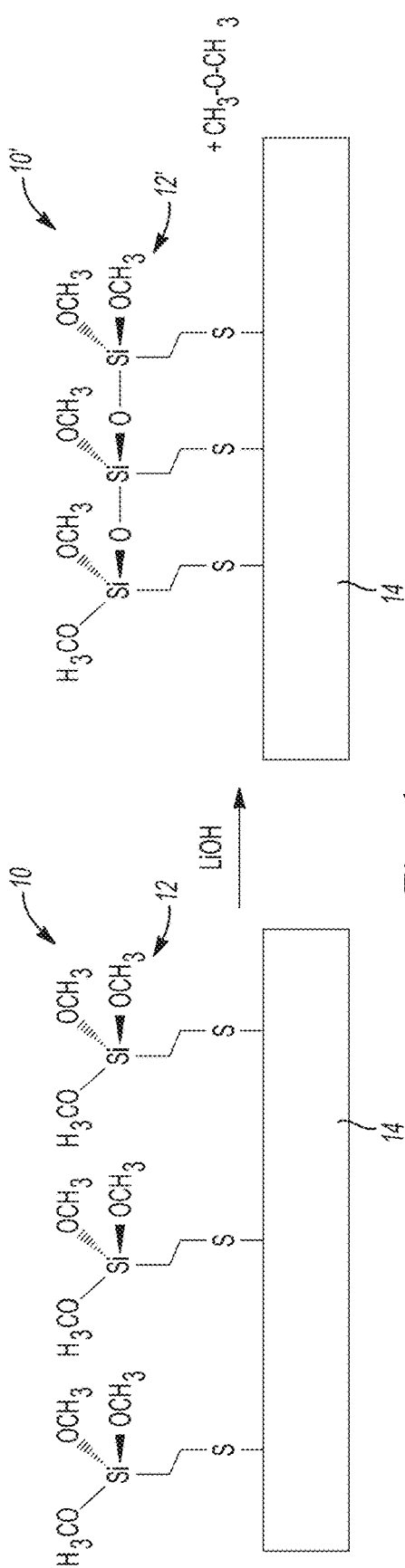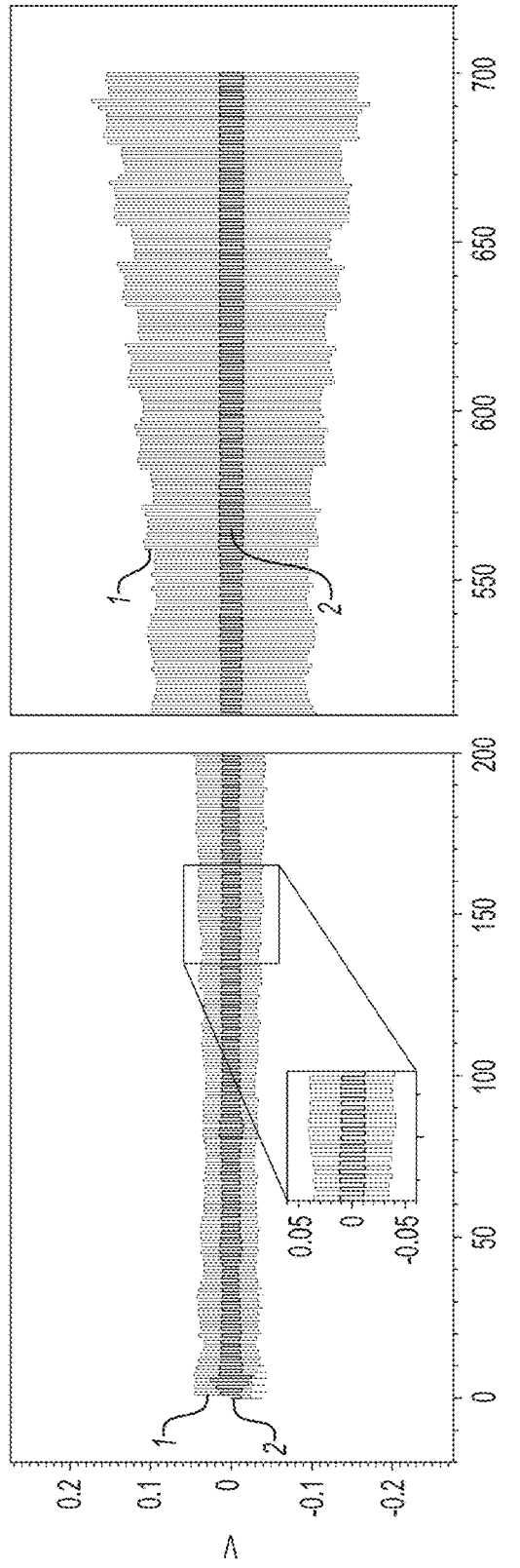
Fig-1
Fig-2A
Fig-2B

ELECTROLYTE AND NEGATIVE ELECTRODE STRUCTURE

CROSS-REFERENCE TO RELATED APPLICATIONS

This application is a divisional of U.S. patent application Ser. No. 14/958,842 filed on Dec. 3, 2015 that claims the benefit of U.S. Provisional Application No. 62/090,181, filed Dec. 10, 2014. The entire disclosures of each of the above applications are incorporated herein by reference.

BACKGROUND

Secondary, or rechargeable, lithium ion batteries or lithium sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example electrolyte includes a solvent, a lithium salt, and an additive selected from the group consisting of a mercaptosilane, a mercaptosiloxane, and combinations thereof. The electrolyte may be used in a method for making a solid electrolyte interface (SEI) layer on a surface of an electrode. A negative electrode structure may be formed from the method.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic illustration of a solid electrolyte interface (SEI) layer formed on a negative electrode in the presence of LiOH;

FIGS. 2A through 2C are graphs illustrating the voltages versus time (T, in hours) for a lithium-lithium symmetrical cell including a comparative electrolyte and an example of the electrolyte disclosed herein;

DETAILED DESCRIPTION

Figure 2C:
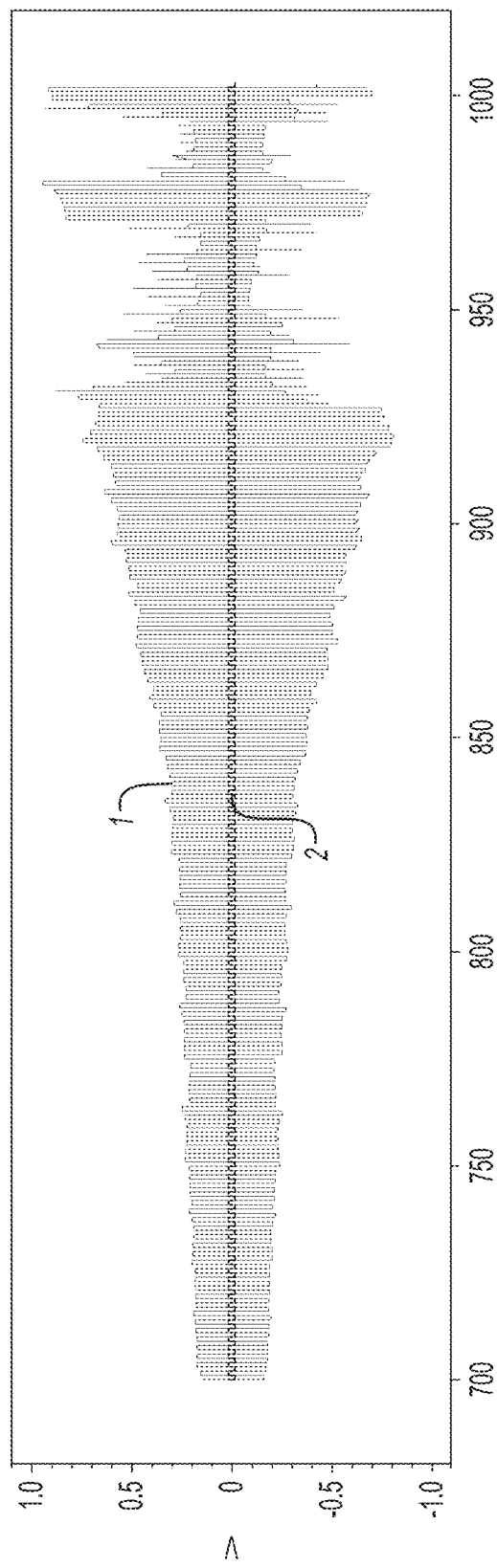

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted/intercalated into the negative electrode, and during discharging, lithium ions are extracted from the negative electrode. Each of the electrodes is also associated with respective current collectors, which are connected by an interruptible external circuit that allows an electric current to pass between the negative and positive electrodes. Examples of lithium-based batteries include a lithium sulfur battery (i.e., includes a sulfur based positive electrode), a lithium ion battery (i.e., includes a lithium based positive electrode), and a lithium-lithium battery (i.e., includes a lithium based positive and negative electrode).

Examples of the negative electrode disclosed herein have a solid electrolyte interphase (SEI) layer formed on a surface thereof. This SEI layer is formed from an additive that is present in an electrolyte solution. Since the additive is present in the electrolyte solution, the SEI layer may be formed in situ in the electrochemical cell. As used herein, the electrochemical cell may refer to the lithium sulfur battery, the lithium ion battery, or a half cell or a Li—Li symmetrical cell (i.e., lithium-lithium battery) with a working electrode and a counter/reference electrode. Other techniques, referred to herein as ex situ techniques, may also be used to form the SEI layer. These techniques are considered to be ex situ because they take place outside of the electrochemical cell.

The additives disclosed herein have a strong interaction with negative electrode materials, such as lithium, silicon, and graphite. It is believed that the chemical reaction between the additive(s) and the electrode may occur even in the absence of an applied voltage.

Examples of the additive include a mercaptosilane, a mercaptosiloxane, and combinations thereof. Some specific examples of the mercaptosilane include 3-mercaptopropyltrimethoxysilane (3-MPS), (mercaptomethyl)methyldiethoxysilane, 3-mercaptopropylmethyldimethoxysilane, 3-mercaptopropyltriethoxysilane, 11-mercaptoundecyloxytrimethylsilane, and combinations thereof. Some specific examples of the mercaptosiloxane include a [4% to 6% (mercaptopropyl)methylsiloxane]-dimethylsiloxane copolymer, a [13% to 17% (mercaptopropyl)methylsiloxane]-dimethylsiloxane copolymer, a (mercaptopropyl)methyl siloxane] homopolymer, and combinations thereof.

The additive(s) is included in an electrolyte. The additive may be included in any suitable amount. As an example, the additive may be included in an amount ranging from about 1 wt % to about 10 wt % of a total wt % of the electrolyte.

The electrolyte also includes a solvent and a lithium salt. The selection of the electrolyte solvent may depend upon whether the SEI layer is to be formed in situ, and if it is to be formed in situ, the type of electrochemical cell that is to be used. When the SEI layer is to be formed in situ in a lithium sulfur battery or a Li—Li symmetrical cell, the electrolyte solvent may be selected from 1,3-dioxolane (DOL), dimethoxyethane (DME), tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof. When the SEI layer is to be formed in situ in a lithium ion battery or a Li—Li symmetrical cell, the electrolyte solvent may be selected from cyclic carbonates (ethylene carbonate (EC), propylene carbonate, butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof. When the SEI layer is to be formed ex situ, any of the previously described electrolyte solvents may be used.

Examples of the lithium salt include $LiClO_4$, $LiAlCl_4$, LiI, LiBr, LiSCN, $LiBF_4$, $LiB(C_6H_5)_4$, $LiAsF_6$, $LiN(FSO_2)_2$ (LIFSI), $LiN(CF_3SO_2)_2$ (LITFSI or lithium bis(trifluoromethylsulfonyl)imide), $LiPF_6$, $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiNO_3$, and mixtures thereof. In an example, the concentration of the salt in the electrolyte is about 1 mol/L.

The electrode upon which the SEI is formed is generally used as a negative electrode in any of the lithium sulfur battery, the lithium ion battery, or the Li—Li symmetrical cell. The negative electrode may include an active material, a binder material, and a conductive filler, or may include lithium metal alone (e.g., in a Li—Li symmetrical cell).

Examples of suitable active materials include any lithium host active material that can sufficiently undergo lithium intercalation and deintercalation, or lithium alloying and dealloying, or lithium insertion and deinsertion, while copper or another current collector functions as the negative terminal of the electrochemical cell. Examples of the lithium host active material include graphite, silicon-based materials, or lithium-based materials. Graphite exhibits favorable lithium intercalation and deintercalation characteristics, is relatively non-reactive, and can store lithium in quantities that produce a relatively high energy density. Commercial forms of graphite that may be used to fabricate the negative electrode are available from, for example, Timcal Graphite & Carbon (Bodio, Switzerland), Lonza Group (Basel, Switzerland), or Superior Graphite (Chicago, Ill.). Examples of the silicon-based active material include crystalline silicon, amorphous silicon, silicon dioxide, silicon suboxide ($SiO_x$, $0<x<2$), silicon alloys (e.g., Si—Sn), etc. The silicon active material may be in the form of a powder, particles, etc. ranging from nano-size to micro-size. Examples of the lithium-based materials include lithium foil or lithium titanate. When lithium foil is used, the polymer binder and conductive filler may not be used.

The binder material may be used to structurally hold the active material together. Examples of the binder material include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Examples of the still other suitable binders include polyvinyl alcohol (PVA), sodium alginate, or other water-soluble binders.

The conductive filler material may be a conductive carbon material. The conductive carbon material may be a high surface area carbon, such as acetylene black. The conductive filler material is included to ensure electron conduction between the active material and the negative-side current collector in the battery.

The negative electrode may include up to 90% by total weight (i.e., 90 wt %) of the active material. In an example, the negative electrode includes from about 70 wt % to about 90 wt % of the active material, from about 5 wt % to about 15 wt % of the conductive filler material, and from about 5 wt % to about 15 wt % of the binder material. As noted above, when lithium foil is used, the negative electrode includes 100% of the active material.

To form the SEI layer on the negative electrode ex situ, any example of the electrolyte disclosed herein may be prepared, the negative electrode may be purchased or prepared, and then the negative electrode may be exposed to the electrolyte. When the SEI layer is formed ex situ on the negative electrode, it is to be understood that the lithium salt may be excluded from the electrolyte. The exposure of the negative electrode to the electrolyte may be accomplished by dip-coating or some other suitable coating technique. The thiol functional groups of the mercaptosilanes and/or mercaptosiloxanes strongly interact (even without application of a voltage) with the negative electrode to form the SEI layer on the surface thereof. In these examples, the negative electrode may be exposed to the electrolyte for a time that is sufficient for the chemical reaction between the additive and the negative electrode surface to take place. As an example, the exposure time may range from about 2 minutes to about 24 hours.

An example of the negative electrode structure 10 formed via the ex situ technique is shown in FIG. 1. The negative electrode structure 10 including the negative electrode 14 and the SEI layer 12 formed thereon is shown at the left hand side in FIG. 1.

Examples of the negative electrode structure 10 formed via the ex situ technique and including a non-lithium active material (such as graphite or a silicon-based material) may be exposed to a pre-lithiation technique in order to lithiate the negative electrode structure 10 and form the negative electrode structure 10'. In these examples, the negative electrode structure 10 may be pre-lithiated using a half cell. More specifically, the half cell is assembled using the negative electrode structure 10, which is soaked in the same electrolyte used to form the SEI layer 12. The half cell includes a counter electrode (e.g., lithium), and a voltage potential is applied to the half cell. The application of the voltage causes lithium metal to penetrate the negative electrode structure 10. More specifically, lithium ions are dissolved (or de-plated) from lithium metal and alloyed with the graphite or silicon-based active material by an electroformation reaction with the electrolyte solution (which can conduct the lithium ions). The lithium ions can alloy with the active material, thereby lithiating the negative electrode structure 10. During pre-lithiation, electrolyte decomposition products (e.g., LiOH, as shown in FIG. 1) may cause the silicon and oxygen atoms of the SEI layer 12 to bond together to form another version of the SEI layer 12' and another version of the negative electrode structure 10'.

After pre-lithiation is complete, the half cell is disassembled and the pre-lithiated negative electrode structure 10' may be washed using a suitable solvent, such as DME. The pre-lithiated negative electrode structure 10' may be coupled with a negative-side current collector and used in any examples of the electrochemical cell/battery disclosed herein. It is to be understood that since the SEI layer is already formed, the electrolyte used in the examples of the electrochemical cell/battery disclosed herein may or may not include the additive. In these examples, the electrolyte used will depend upon the type of electrochemical cell/battery.

It is to be understood that the negative electrode structure 10 may not be pre-lithiated when lithium is used as the active material.

To form the SEI layer on the negative electrode in situ (i.e., in the electrochemical cell), the battery may be assembled with the negative electrode, a suitable positive electrode, a porous polymer separator positioned between the negative and positive electrodes, and an example of the electrolyte including a suitable solvent for the particular battery type.

For the lithium sulfur battery/electrochemical cell, any example of the negative electrode (e.g., electrode 14 with a lithium-based, silicon-based, or graphite active material) may be used.

The positive electrode of the lithium sulfur battery includes any sulfur-based active material that can sufficiently undergo lithium alloying and dealloying with aluminum or another suitable current collector functioning as the positive terminal of the lithium sulfur electrochemical cell. An example of the sulfur-based active material is a sulfur-carbon composite. In an example, the weight ratio of S to C in the positive electrode ranges from 1:9 to 8:1. The positive electrode in the lithium sulfur battery may include any of the previously mentioned binder materials and conductive fillers.

The porous polymer separator may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 16 include single layer polypropylene membranes, such as CELGARD 2400 and CELGARD 2500 from Celgard, LLC (Charlotte, N.C.). It is to be understood that the porous separator may be coated or treated, or uncoated or untreated. For example, the porous separator may or may not be coated or include any surfactant treatment thereon.

In other examples, the porous separator may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator is poly(p-hydroxybenzoic acid). In yet another example, the porous separator may be chosen from a combination of the polyolefin (such as PE and/or PP) and one or more of the other polymers listed above.

The porous separator may be a single layer or may be a multi-layer (e.g., bilayer, trilayer, etc.) laminate fabricated from either a dry or wet process. The porous separator operates as an electrical insulator (preventing the occurrence of a short), a mechanical support, and a barrier to prevent physical contact between the two electrodes. The porous separator also ensures passage of lithium ions through the electrolyte solution filling its pores.

The negative electrode, positive electrode, and porous separator are soaked with the electrolyte disclosed herein, including the additive, the lithium salt, and the solvent suitable for the lithium sulfur battery.

The lithium sulfur battery/electrochemical cell also includes an external circuit and a load. The application of the load to the lithium sulfur electrochemical cell closes the external circuit and connects the negative electrode and the positive electrode. The closed external circuit enables a working voltage to be applied across the lithium sulfur electrochemical cell.

Upon the initial exposure of the negative electrode to the electrolyte, the additive may begin to react to form the SEI layer on the surface of the negative electrode. A voltage potential may also be applied to the electrochemical cell/battery in order to pre-lithiate the negative electrode and to enhance the formation of the SEI layer. During the voltage application, lithium metal penetrates the negative electrode, and the additive in the electrolyte reacts with the negative electrode surface to form the SEI layer (e.g., 12 or 12') thereon.

For the lithium ion battery/electrochemical cell, any example of the negative electrode (e.g., electrode 14 with a lithium-based, a silicon-based or graphite active material) may be used.

The positive electrode of the lithium ion battery includes any lithium-based active material that can sufficiently undergo lithium insertion and deinsertion with aluminum or another suitable current collector functioning as the positive terminal of the lithium ion electrochemical cell. One common class of known lithium-based active materials suitable for this example of the positive electrode includes layered lithium transition metal oxides. For example, the lithium-based active material may be spinel lithium manganese oxide ($LiMn_2O_4$), lithium cobalt oxide ($LiCoO_2$), a manganese-nickel oxide spinel [$Li(Mn_{1.5}Ni_{0.5})O_2$], or a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable lithium-based active materials include [$Li(Ni_{1/3}Mn_{1/3}Co_{1/3})O_2$], $LiNiO_2$, $Li_2MSiO_4$ (M is composed of any ratio of Co, Fe, and/or Mn), $Li_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$). Still other lithium-based active materials may also be utilized, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel (e.g., $Li_xAl_{0.05}Mn_{0.95}O_2$), lithium vanadium oxide ($LiV_2O_5$), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The positive electrode in the lithium ion electrochemical cell/battery may include any of the previously mentioned binder materials and conductive fillers.

The lithium ion electrochemical cell/battery may also include any of the previously provided examples of the porous polymer separator.

The negative electrode, positive electrode, and porous separator are soaked with the electrolyte disclosed herein, including the additive, the lithium salt, and the solvent suitable for the lithium ion battery.

The lithium ion battery/electrochemical cell also includes an external circuit and a load. The application of the load to the lithium ion electrochemical cell closes the external circuit and connects the negative electrode and the positive electrode. The closed external circuit enables a working voltage to be applied across the lithium ion electrochemical cell.

Upon the initial exposure of the negative electrode to the electrolyte, the additive may begin to react to form the SEI layer on the surface of the negative electrode. A voltage potential may also be applied to the electrochemical cell/battery in order to pre-lithiate the negative electrode and enhance the formation of the SEI layer. During the voltage application, lithium metal penetrates the negative electrode, and the additive in the electrolyte reacts with the negative electrode surface to form the SEI layer (e.g., 12 or 12') thereon.

For the Li—Li symmetrical electrochemical cell (i.e., lithium-lithium battery), the negative electrode (or counter electrode) is formed of lithium metal. The positive electrode of the Li—Li symmetrical cell may include a copper working electrode plated with lithium (e.g., 1 mAh Li onto the copper).

The lithium-lithium symmetrical electrochemical cell may also include any of the previously provided examples of the porous polymer separator.

The negative electrode, positive electrode, and porous separator are soaked with the electrolyte disclosed herein, including the additive, the lithium salt, and the solvent suitable for the lithium-lithium symmetrical cell.

The lithium-lithium symmetrical electrochemical cell also includes an external circuit and a load. The application of the load to the lithium-lithium electrochemical cell closes the external circuit and connects the negative electrode and the positive electrode. The closed external circuit enables a working voltage to be applied across the lithium-lithium symmetrical electrochemical cell.

Upon the initial exposure of the negative electrode to the electrolyte, the additive may begin to react to form the SEI layer on the surface of the negative electrode. Voltage may be applied on the negative electrode (e.g., a charging cycle), in order to force the reaction to happen between the additive in the electrolyte and the negative electrode. Prior to and during the voltage application, lithium metal penetrates the negative electrode, and the additive in the electrolyte reacts with the highly reactive lithium metal negative electrode surface to form the SEI layer (e.g., 12 or 12') thereon.

It is to be understood that the lithium-lithium symmetrical electrochemical cell may be used as a lithium-lithium battery. It is to be understood that the negative electrode structure (i.e., lithium metal electrode with the SEI layer thereon) formed in situ in the lithium-lithium symmetrical electrochemical cell may alternatively be rinsed and incorporated as the negative electrode in another lithium metal based battery.

In any of the examples disclosed herein involving in situ formation of the SEI layer, the voltage potential that is applied may range from about −2 volts to about 3.0 volts.

The SEI layer 12, 12' disclosed herein is a protective coating in that it protects the negative electrode 14 from additional reactions with the electrolyte. The SEI layer 12, 12' also exhibits uniformity (in composition and thickness) and adhesion to the negative electrode 14.

To further illustrate the present disclosure, examples are given herein. It is to be understood that these examples are provided for illustrative purposes and are not to be construed as limiting the scope of the present disclosure.

Example 1

Lithium symmetrical cells were prepared with lithium foil negative and positive electrodes. The comparative cell included a comparative electrolyte, which included 1M $LiPF_6$ in EC/DMC (1:1 vol ratio). The example cell included an example of the electrolyte disclosed herein, which included 1M $LiPF_6$ in EC/DMC (1:1 vol ratio) and 5% of 3-MPS. The test conditions for the comparative and example cells were: room temperature; current density=0.39 $mA/cm^2$; 1 hour for charge and discharge, repeated 1000 hours; and cutoff voltage=from −2V to 2V. FIGS. 2A through 2C illustrate the voltage (V, Y-axis) versus time (T, X-axis, in hours) for the comparative (labeled "1") and example (labeled "2") cells. The results illustrate that the example cell including the example electrolyte exhibits much more stable performance over time when compared to the comparative cell.

Example 2

To illustrate that an electrode may be coated ex situ, an example electrolyte was prepared including 0.1% of 3-MPS in DOL/DME (1:1 vol ratio). A copper electrode was then immersed in the electrolyte using dip-coating. The copper electrode was allowed to react with the 3-MPS for 2 hours.

The 3-MPS coated copper electrode was then used as a working electrode in an example electrochemical cell including a lithium counter/reference electrode. The electrolyte in the example cell included 0.5M LiTFSI and 0.4M $LiNO_3$ in DOL/DME (1:1 vol ratio).

A comparative electrochemical cell included an uncoated copper working electrode and a lithium counter/reference electrode. The electrolyte in the comparative cell included 0.5M LiTFSI and 0.4M $LiNO_3$ in DOL/DME (1:1 vol ratio) (without any 3-MPS).

Figure 3:
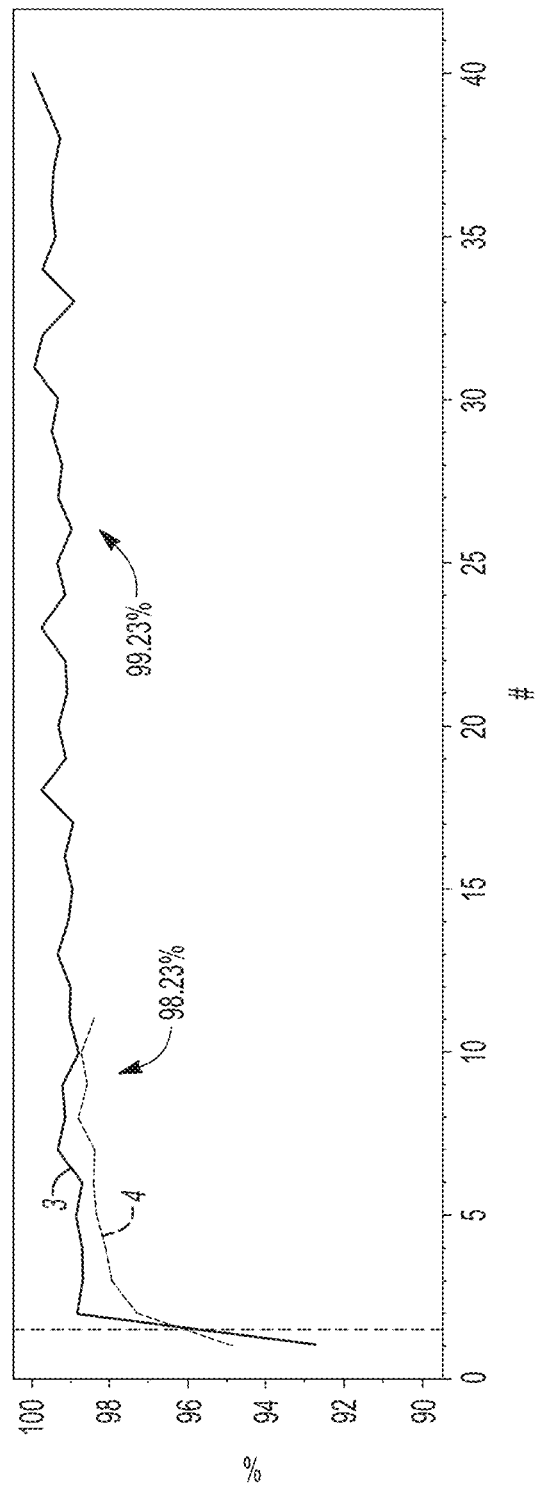
FIG. 3 is a graph illustrating the Coulombic efficiency (%) of a copper working electrode coated with 3-mercaptopropyltrimethoxysilane.

The test conditions for the comparative and example cells were: room temperature; current=200 μA; area=1.23 $cm^2$; electric charge=1 mA h; and 100% depth of discharge (DOD). The Coulombic efficiency results are shown in FIG. 3 as a percentage. In FIG. 3, the Y axis, labeled %, represents the Coulombic efficiency (percentage) and the X axis, labeled "#," represents the cycle number. As illustrated in FIG. 3, throughout the cycles, the Coulombic efficiency of the example cell (labeled "3") with the SEI layer disclosed herein i) was slightly higher than the Coulombic efficiency of the comparative cell (labeled "4") and ii) outperformed the comparative cell by several cycles.

Example 3

An example electrochemical cell was formulated with a copper working electrode and a lithium counter/reference electrode. The electrolyte included 0.4M LiTFSI and 0.6M LiNO$_3$ in DOL/DME (1:1 vol ratio) and 2% of poly(mercaptopropyl)methylsiloxane.

A comparative electrochemical cell also included a copper working electrode and a lithium counter/reference electrode. The electrolyte in the comparative cell included 00.4M LiTFSI and 0.6M LiNO$_3$ in DOL/DME (1:1 vol ratio) (without any poly(mercaptopropyl)methylsiloxane).

Figure 4:
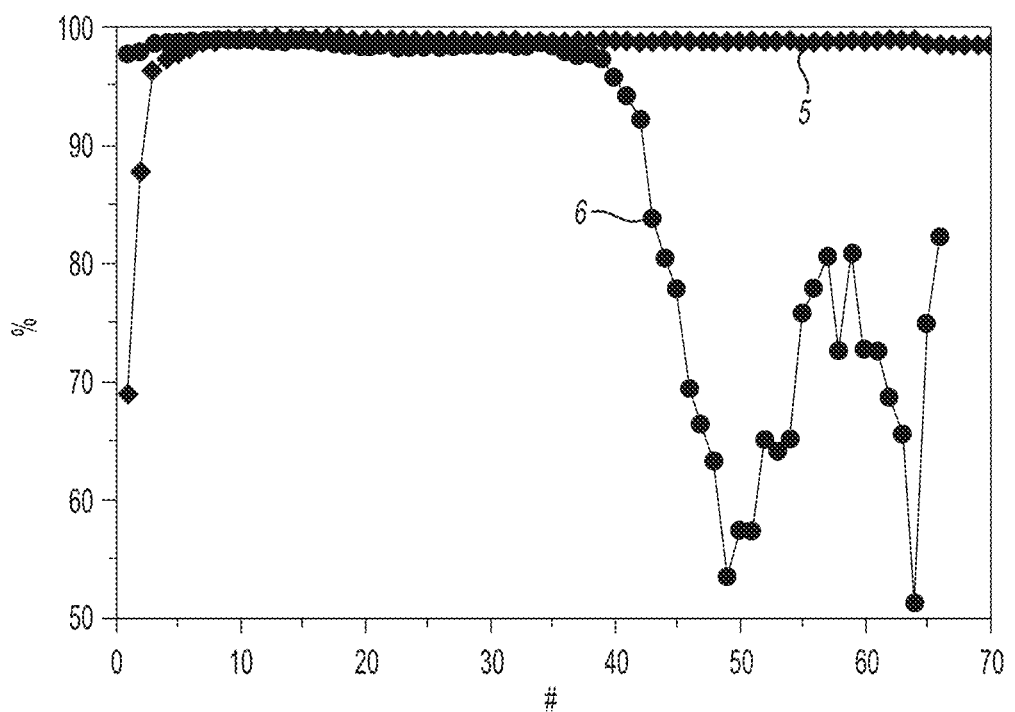
FIG. 4 is a graph illustrating the Coulombic efficiency (%) of a copper working electrode with poly(mercaptopropyl)methylsiloxane in the electrolyte.

The test conditions for the comparative and example cells were: room temperature; current=200 µA; area=1.23 cm$^2$; electric charge=1 mA h; and 100% depth of discharge (DOD). The Coulombic efficiency results are shown in FIG. 4 as a percentage. In FIG. 4, the Y axis, labeled %, represents the Coulombic efficiency (percentage) and the X axis, labeled "#," represents the cycle number. As illustrated in FIG. 4, throughout the cycles, the Coulombic efficiency of the example cell (labeled "5") with the mercaptosiloxane additive in the electrolyte was generally higher and more stable than the Coulombic efficiency of the comparative cell (labeled "6").

It is to be understood that the ranges provided herein include the stated range and any value or sub-range within the stated range. For example, a range of from 1:9 to 8:1 should be interpreted to include not only the explicitly recited limits of from 1:9 to 8:1, but also to include individual values, such as 1:2, 7:1, etc., and sub-ranges, such as from about 1:3 to 6:3 (i.e., 2:1), etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for forming a protective solid electrolyte interface (SEI) layer on a surface of an electrode, wherein the method comprises:
    exposing the electrode to an electrolyte, the electrolyte including:
        a solvent;
        a lithium salt; and
        an additive, wherein the additive is a mercaptosiloxane and is present in an amount ranging from about 2 wt % to about 5 wt % of a total wt % of the electrolyte;
        wherein the additive interacts with the surface of the electrode to form the protective solid electrolyte interface (SEI) layer.

2. The method as defined in claim 1, wherein the solvent is selected from the group consisting of 1,3-dioxolane, dimethoxyethane, tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof; and
    the lithium salt is selected from the group consisting of lithium bis(trifluoromethylsulfonyl)imide (LiN(CF$_3$SO$_2$)$_2$ or LiTFSI), LiNO$_3$, LiPF$_6$, LiBF$_4$, LiI, LiBr, LiSCN, LiClO$_4$, LiAlCl$_4$, LiB(C$_2$O$_4$)$_2$ (LiBOB), LiB(C$_6$H$_5$)$_4$, LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiAsF$_6$, and combinations thereof.

3. The method as defined in claim 1, wherein the solvent is selected from the group consisting of ethylene carbonate, propylene carbonate, butylene carbonate, fluoroethylene carbonate, dimethyl carbonate, diethyl carbonate, ethylmethyl carbonate, methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, and combinations thereof; and
    the lithium salt is selected from the group consisting of lithium bis(trifluoromethylsulfonyl)imide (LiN(CF$_3$SO$_2$)$_2$ or LiTFSI), LiNO$_3$, LiPF$_6$, LiBF$_4$, LiI, LiBr, LiSCN, LiClO$_4$, LiAlCl$_4$, LiB(C$_2$O$_4$)$_2$ (LiBOB), LiB(C$_6$H$_5$)$_4$, LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiAsF$_6$, and combinations thereof.

4. A method for pre-lithiating a negative electrode and forming a solid electrolyte interface (SEI) layer on a surface of the negative electrode, wherein the method comprises:
    contacting the negative electrode with an electrolyte including:
        one or more solvents;
        one or more lithium salts; and
        an additive, wherein the additive is a mercaptosiloxane and is present in an amount ranging from about 2 wt % to about 5 wt % of a total wt % of the electrolyte; and
    applying a voltage across the negative electrode that is greater than or equal to about −2 volts to less than or equal to about 3.0 volts for a time greater than or equal to about 2 minutes to less than or equal to about 24 hours, wherein upon application of the voltage one or more thiol groups of the additive reacts with the surface of the negative electrode to form the protective solid electrolyte interface (SEI) layer.

5. The method as defined in claim 4, wherein the solvent is selected from the group consisting of 1,3-dioxolane, dimethoxyethane, tetrahydrofuran, 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof; and
    the lithium salt is selected from the group consisting of lithium bis(trifluoromethylsulfonyl)imide (LiN(CF$_3$SO$_2$)$_2$ or LiTFSI), LiNO$_3$, LiPF$_6$, LiBF$_4$, LiI, LiBr, LiSCN, LiClO$_4$, LiAlCl$_4$, LiB(C$_2$O$_4$)$_2$ (LiBOB), LiB(C$_6$H$_5$)$_4$, LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiAsF$_6$, and combinations thereof.

6. The method as defined in claim 4, wherein the solvent is selected from the group consisting of ethylene carbonate, propylene carbonate, butylene carbonate, fluoroethylene carbonate, dimethyl carbonate, diethyl carbonate, ethylmethyl carbonate, methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, and combinations thereof; and the lithium salt is selected from the group consisting of lithium bis(trifluoromethylsulfonyl)imide (LiN($CF_3SO_2$)$_2$ or LiTFSI), $LiNO_3$, $LiPF_6$, $LiBF_4$, LiI, LiBr, LiSCN, $LiClO_4$, $LiAlCl_4$, $LiB(C_2O_4)_2$ (LiBOB), LiB($C_6H_5$)$_4$, $LiBF_2(C_2O_4)$ (LiODFB), $LiN(SO_2F)_2$ (LiFSI), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiAsF_6$, and combinations thereof.

7. The method as defined in claim 4, wherein the negative electrode is exposed to the electrolyte in an electrochemical cell.

8. The method as defined in claim 4, wherein the additive reacts with the surface of the electrode in the presence of lithium and one or more electrolyte decomposition products to form the protective solid electrolyte interface (SEI) layer.

9. The method as defined in claim 8, wherein the one or more electrolyte decomposition products include LiOH.

10. The method as defined in claim 4, wherein the electrolyte is a first electrolyte and the solvent is a first solvent and the method further includes washing the electrode with the protective solid electrolyte interface (SEI) layer with a second solvent and disposing the electrode with the protective solid electrolyte interface (SEI) layer in an electrochemical cell comprising a second electrolyte.

11. The method as defined in claim 10, wherein the second solvent comprises dimethoxyethane.

12. The method as defined in claim 4, wherein the protective solid electrolyte interface (SEI) layer is substantially homogeneous and has a substantially uniform thickness.

* * * * *